United States Patent
Kashiwagi (10) Patent No.: US 7,539,847 B2
(45) Date of Patent: May 26, 2009

(54) STALLING PROCESSOR PIPELINE FOR SYNCHRONIZATION WITH COPROCESSOR RECONFIGURED TO ACCOMMODATE HIGHER FREQUENCY OPERATION RESULTING IN ADDITIONAL NUMBER OF PIPELINE STAGES

(75) Inventor: Shinji Kashiwagi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 184 days.

(21) Appl. No.: 11/625,639

(22) Filed: Jan. 22, 2007

(65) Prior Publication Data

US 2007/0180220 A1 Aug. 2, 2007

(30) Foreign Application Priority Data

Jan. 30, 2006 (JP) ............................. 2006-020332

(51) Int. Cl.
*G06F 9/38* (2006.01)

(52) U.S. Cl. .................................... 712/34; 713/400

(58) Field of Classification Search ................ None
See application file for complete search history.

(56) References Cited

U.S. PATENT DOCUMENTS

| | | | | |
|---|---|---|---|---|
| 4,943,915 | A * | 7/1990 | Wilhelm et al. | 712/34 |
| 6,434,689 | B2 * | 8/2002 | Fleck et al. | 712/34 |
| 6,829,697 | B1 * | 12/2004 | Davis et al. | 712/21 |
| 6,832,117 | B1 * | 12/2004 | Miyamori | 700/2 |

FOREIGN PATENT DOCUMENTS

JP 9-319578 A 12/1997

* cited by examiner

*Primary Examiner*—Kenneth S Kim
(74) *Attorney, Agent, or Firm*—Sughrue Mion, PLLC (57) ABSTRACT

A processor system that includes a main processor, and a coprocessor connected to the main processor. If the number of instruction execution cycles of an extended instruction executed by the coprocessor is larger than the number of instruction execution cycles of a basic instruction executed by the main processor, a pipeline process for a subsequent instruction retrieved after the extended instruction is stopped at least for a period corresponding to a difference between the number of instruction execution cycles of the extended instruction and the number of instruction execution cycles of the basic instruction.

6 Claims, 8 Drawing Sheets

RELATED ART

Fig. 8A

RELATED ART

Fig. 8B

STALLING PROCESSOR PIPELINE FOR SYNCHRONIZATION WITH COPROCESSOR RECONFIGURED TO ACCOMMODATE HIGHER FREQUENCY OPERATION RESULTING IN ADDITIONAL NUMBER OF PIPELINE STAGES

BACKGROUND OF THE INVENTION

1. Field of the Invention

The present invention relates to a processor system having a main processor with a coprocessor connected thereto.

2. Description of Related Art

A technology that uses a coprocessor specialized in a particular process in order to improve performance of a microprocessor is known in the art. Exchanging data between a main processor and a coprocessor in a processor system is generally performed via a storage region accessible for the main processor and the coprocessor. For example a general purpose register mounted to the main processor is used as the storage region for exchanging data between the main processor and the coprocessor.

In the processor system using the coprocessor, generally an instruction executed in the coprocessor (hereinafter referred to as an extended instruction) is issued from the main processor to the coprocessor. The coprocessor retrieves data from the general purpose register mounted to the main processor, executes the extended instruction, and stores the result of the execution of the extended instruction to the general purpose register.

For the main processor to use the execution result of the extended instruction by the coprocessor, the main processor needs to access the storage region storing the execution result after completing to write the execution result by the coprocessor. Therefore, the processor system having the coprocessor requires a mechanism for adjusting a timing to write the execution result by the coprocessor to the storage region such as the general purpose register and a timing for the main processor to access the storage region storing the execution result by the coprocessor.

As one of the adjusting mechanisms, there is a configuration for having the same number of pipeline stages for the main processor and the coprocessor (see Japanese Unexamined Patent Application Publication No. 9-319578). Specifically, whether the fetched instruction is an instruction executed by the main processor (hereinafter referred to as a basic instruction) or an extended instruction executed by the coprocessor, the number of clock cycles necessary for processes from fetching the instruction to completing the instruction is kept constant. Such configuration facilitates a pipeline control because the pipeline control including an interlock control may be performed regardless whether the fetched instruction is the basic or the extended instruction.

Figure 7:
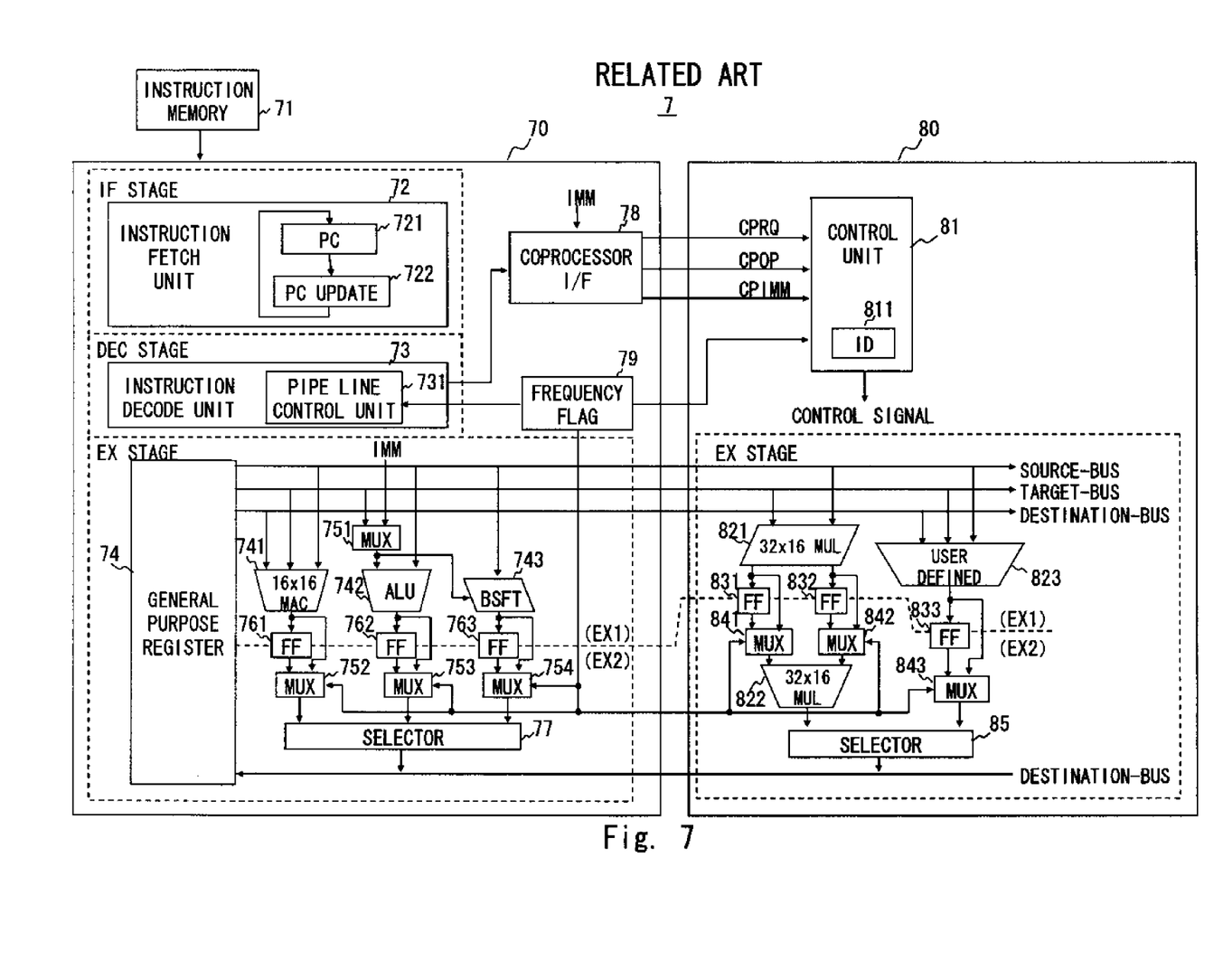
FIG. 7 is a block diagram showing a processor system according to a conventional technique.

An example of a processor system securing to synchronize the main processor and the coprocessor by having the same number of pipeline stages of the main processor and the coprocessor is shown in FIG. 7. A processor system 7 of FIG. 7 has a coprocessor 80 connected to a main processor 70. Components of the processor system 7 are described hereinafter in detail.

An instruction fetch unit 72 sequentially retrieves instructions from an instruction memory 71 using address information stored to a program counter 721. After retrieving an instruction, a PC update unit 722 updates a value of the program counter 721 to retrieve the next instruction.

An instruction decode unit 73 decodes the instruction retrieved by the instruction fetch unit 72. The instruction decode unit 73 issues an instruction to a computing unit included in the main processor 70 if the decoded instruction is a basic instruction. On the other hand if the decoded instruction is the extended instruction, the instruction decode unit 73 transfers the instruction to the coprocessor 80 via a coprocessor I/F 78. A request signal (CPRQ) requesting to execute the extended instruction, an instruction code (CPOP), and an immediate value (CPIMM) are transferred from the coprocessor I/F 78 to the coprocessor 80.

A pipeline control unit 731 included in the instruction decode unit 73 performs an interlock control for a pipeline process of the main processor 70.

The main processor 70 includes a multiplier-accumulator (MAC) 741, an Arithmetic Logical Unit (ALU) 741, and a barrel shifter (BSFT) 743. Depending on a type of a process specified by the basic instruction, a computing unit is selected from the MAC 741, the ALU 742, and the BSFT 743. Then an input value is fetched from a general purpose register 74 to execute the basic instruction. An execution result of the basic instruction is stored to the general purpose register 74 via a destination bus. A MUX 751 is a circuit for selecting an operand for the ALU 742 between the immediate value (IMM) and the general purpose register 74. A selector 77 is a circuit for selecting output data to the destination bus from outputs of the MAC 741, the ALU 742, and the BSFT 743.

A control unit 81 included in the coprocessor 80 receives the CPRQ, the CPOP, and the CPIMM that are input via the coprocessor I/F 78. An instruction decode unit 811 decodes the extended instruction and outputs a control signal necessary for computing units included in the coprocessor 80 to execute the extended instruction. The control signal includes a processing request to the computing units, an indication of an operand register, and an immediate value.

The coprocessor 80 includes multipliers (MUL) 821 and 822, and a user-defined computing unit 823. Depending on a type of a process defined by the extended instruction, either the MULs 821 and 822 or the user-defined computing unit 823 is selected to fetch the input value from the general purpose register 74 to execute the instruction. An execution result of the extended instruction is stored to the general purpose register 74 via the destination bus. The MUL 821 is a former half of 32 bits×16 bits multiplier that generates partial products or the like by Booth algorithm. The MUL 822 is a latter half of 32 bits×16 bits multiplier that adds the partial products. A 32 bits×16 bits multiplication instruction is executed by two stages of the MULs 821 and 822.

A frequency flag 79 indicates whether a clock frequency of the processor system 7 is high or low speed, or indicates whether to divide an EX stage of the main processor 70 and the coprocessor 80. For example in a case the EX stage needs to be divided with clock frequency exceeding 200 MHz, the flag is set to on if the clock frequency is higher or equal to 200 MHz, and the flag is set to off if the clock frequency is lower or equal to 200 MHz.

When the frequency flag 79 is set to on, specifically when the clock frequency is high speed, in the main processor 70, multiplexers 752 to 754 output input signals from flip-flops (FF) 761 to 763. On the other hand when the frequency flag 79 is set to off, specifically when the clock frequency is low speed, the multiplexers 752 to 754 output input signals from the MAC 741, ALU 742, or BSFT 743.

Similarly with when the frequency flag 70 is set to on, specifically when the clock frequency is high speed, in the coprocessor 80, multiplexers 841 to 843 output input signals from flip-flops (FF) 831 to 833. On the other hand when the frequency flag 79 off, specifically when the clock frequency is low speed, the multiplexers 841 to 843 output input signals from the MUL 821 or the user-defined computing unit 823.

A pipeline control unit 731 included in the main processor 70 monitors the frequency flag 79 to get the number of clock cycles required for the EX stage of the main processor 70. Then if the frequency flag 79 is set to on, the EX stage is divided into an EX1 and EX2 stages to operate them in 2 clock cycles.

Similarly a control unit 81 included in the coprocessor 80 monitors the frequency flag 79 to get the number of clock cycles required for the EX stage of the coprocessor 80. Then if the frequency flag 79 is set to on, the EX stage is divided into EX1 and EX2 stages to operate them in 2 clock cycles.

Figure 8A:
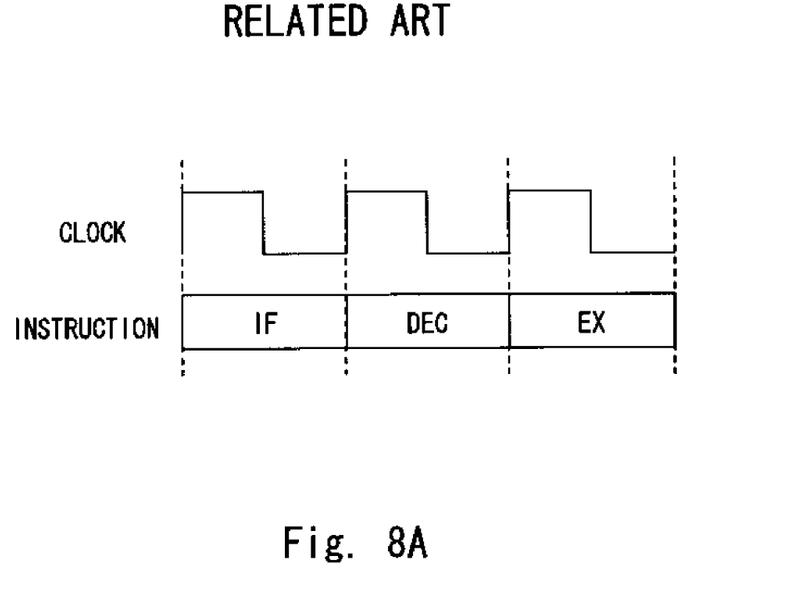
FIGS. 8A and 8B are views showing a pipeline of a processor system according to a conventional technique.

A concept of the pipeline process of the processor system 7 is described hereinafter in detail with reference to timing diagrams of FIGS. 8A and 8B. FIG. 8A is a view showing a case with the clock frequency being low, and each of IF, DEC, and EX stages are executed in 1 clock cycle. In the IF stage, a process of the instruction fetch unit 72 is executed, and in the DEC stage a process of the instruction decode unit 73 is executed. For the basic instruction in the EX stage, operations by the computing units (MAC 741, ALU 742, and BSFT 743) included in the main processor 70, and writing of the execution result to the general purpose register are performed. For the extended instruction in the EX stage, a decoding of the extended instruction by the instruction decode unit 811, processes by the computing units in the coprocessor (MULs 821 and 822 or the user-defined computing unit 823), and a writing of the execution result to the general purpose register 74 are performed.

Figure 8B:
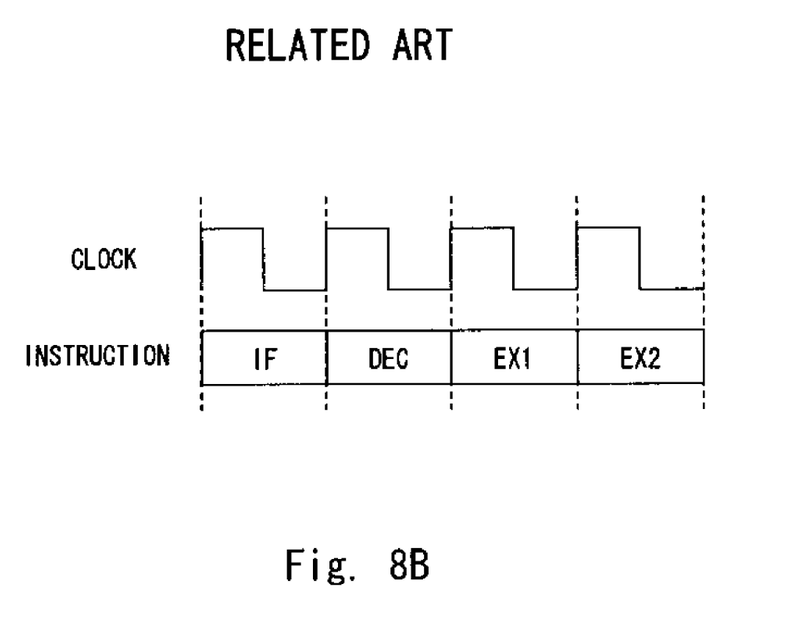

On the other hand FIG. 8B is a view showing a case with the clock frequency being high, and the EX stage is divided into EX1 and EX2 stages to be performed in 2 clock cycles.

For the basic instruction, the processes by the computing units (MAC 741 and ALU 742, or BSFT 743) of the main processor 70 are performed in the EX1 stage, and the writing of the execution result to the general purpose register 74. For the extended instruction, operation by the MUL 821 or the user-defined computing unit 823 is performed in the EX1 stage, and the writing of the execution result to the general purpose register 74 is performed in the EX2 stage.

As described in the foregoing, the processor system 7 divides the EX stage of the coprocessor 80 if the clock frequency is high speed, and in response to this, the EX stage of the main processor 70 is divided into two stages. This enables the number of clock cycles required from decoding to completion of the execution of the basic instruction executed in the main processor 70 to be changed according to the number of clock cycles required from decoding to completion of the execution of the extended instruction executed in the coprocessor 80. The number of clock cycles required from decoding to the execution completion of the instruction is hereinafter referred to as the number of instruction execution cycles.

The processor system 7 constituted as above is able to have the same number of pipeline stages and the number of instruction execution cycles of the main processor 70 and the coprocessor 80, enabling to secure to synchronize the main processor and the coprocessor.

In the processor system securing to synchronize the main processor and the coprocessor by having the same number of instruction execution cycles of the main processor and the coprocessor, if the number of clock cycles required to execute the instruction in the coprocessor increases, the number of instruction execution cycles of the main processor must be increased in accordance with the number of instruction execution cycles of the coprocessor, regardless of the performance of the main processor.

The increase of the number of instruction execution cycles, specifically the increase of the number of pipeline stages, causes to deteriorate branch penalty. Therefore in the conventional processor system, the branch penalty is deteriorated in the main processor, not only in the coprocessor, if the number of instruction execution cycles of the coprocessor increases as in the high speed operation.

SUMMARY OF THE INVENTION

According to an aspect of the present invention, there is provided a processor system that includes a main processor, and a coprocessor connected to the main processor. If the number of instruction execution cycles of an extended instruction executed by the coprocessor is larger than the number of instruction execution cycles of a basic instruction executed by the main processor, a pipeline process for a subsequent instruction retrieved after the extended instruction is stopped at least for a period corresponding to a difference between the number of instruction execution cycles of the extended instruction and the number of instruction execution cycles of the basic instruction.

With such configuration, if the number of instruction execution cycles of the basic instruction and the number of instruction execution cycles of the extended instruction differ, the main processor can wait for the execution of the extended instruction by the coprocessor to be completed. Accordingly the number of instruction execution cycles of the main processor does not need to be changed depending on the number of instruction execution cycles of the coprocessor. Thus the processor system of this invention suppresses from deteriorating the branch penalty caused from increasing the number of instruction execution cycles of the main processor depending on the number of instruction execution cycles of the coprocessor.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In the drawings, components identical are denoted by reference numerals identical to those therein with detailed description omitted for clarity as appropriate.

First Embodiment

Figure 1:
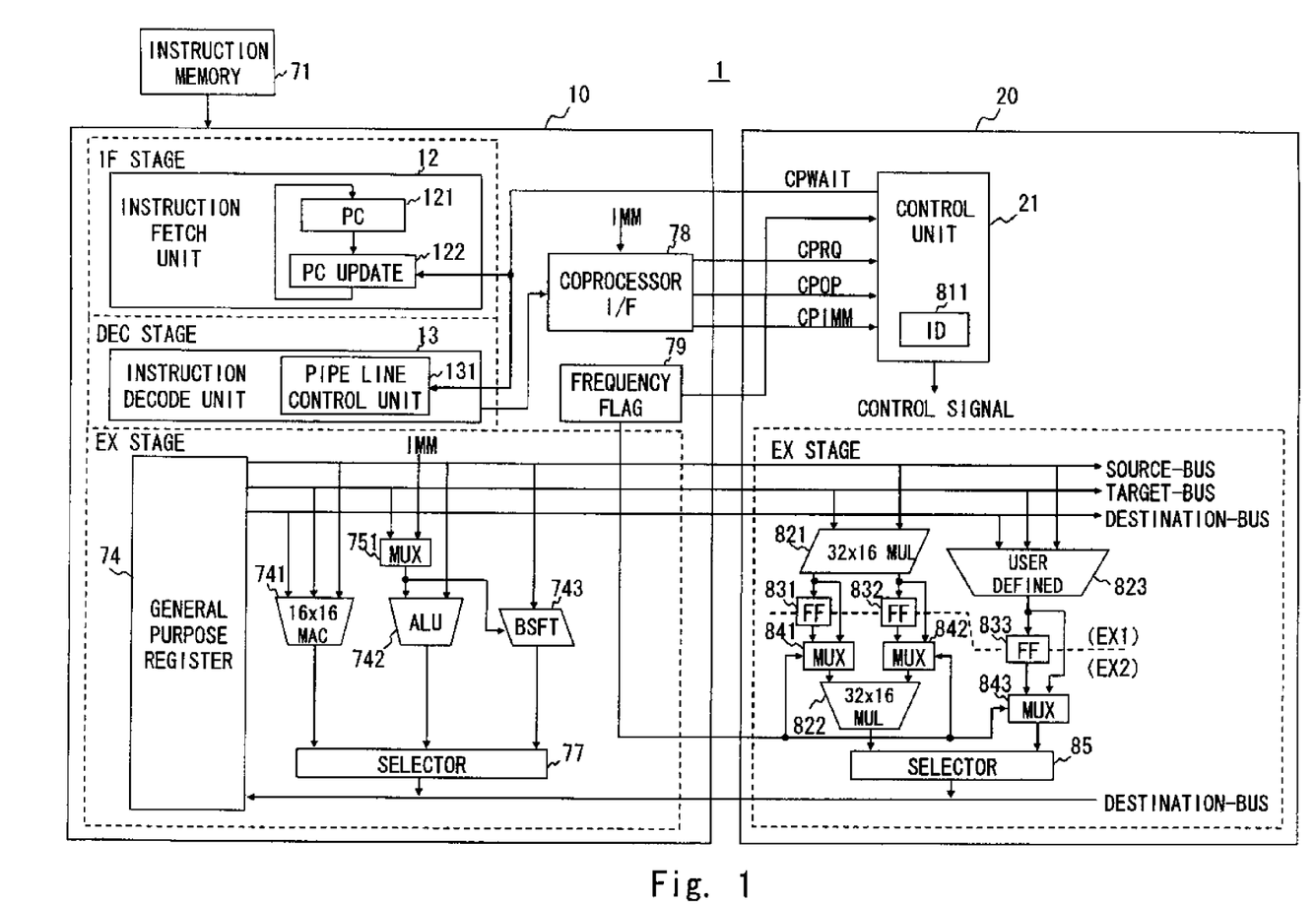
FIG. 1 is a block diagram showing a configuration of a processor system according to a first embodiment of the present invention.

The processor system 1 includes a main processor 10 and a coprocessor 20 connected to the main processor 10. Each components included in the processor system 1 are described hereinafter in detail.

An instruction fetch unit 12 sequentially retrieves instructions from an instruction memory 71 using address information stored to a program counter 121. After retrieving the instruction, a PC update unit 122 updates a value of the program counter 121 to retrieve the next instruction.

An instruction decode unit 13 decodes the instruction retrieved by the instruction fetch unit 12. If the decoded instruction is the basic instruction, the instruction decode unit 13 issues an instruction to computing units included in the main processor 10. On the other hand if the decoded instruction is the extended instruction, the instruction decode unit 13 issues an instruction to computing units included in the coprocessor 20 via a coprocessor I/F 78. A request signal (CPRQ) requesting to execute the extended instruction, an instruction code (CPOP), and an immediate value (CPIMM) are transferred from the coprocessor I/F 78 to the coprocessor 20.

A pipeline control unit 131 performs an interlock control of the pipeline process. The pipeline control unit 131 is characterized in that it performs the interlock control of pipeline according to a CPWAIT signal input from the coprocessor 20. Details of the interlock control using the CPWAIT signal are described later in detail.

A general purpose register 74, the computing units (MAC 741, ALU 742, and BSFT 743), a MUX 751, and a selector 77 are identical to those included in the conventional processor system 7 described above.

However the main processor 10 does not need to change the number of instruction execution cycles depending on the change in the number of instruction execution cycles of the coprocessor 20. Therefore the FFs 761 to 763, and MUXs 752 to 754 are removed from the main processor 1 of this embodiment.

Components of the coprocessor 20 are described hereinafter in detail. A control unit 21 receives CPRQ, CPOP, and CPIMM that are input via the coprocessor I/F 78. The instruction decode unit 811 decodes the extended instruction and outputs a control signal required to execute the extended instruction in computing units included in the coprocessor 20. The control signal includes a processing request to the computing units, an indication of an operand register, and an immediate value. The control unit 21 monitors the frequency flag 79 and gets the number of clock cycles required for the EX stage of the coprocessor 20. Then if the frequency flag 79 is set to on, the EX stage is divided into two stages of the EX1 and EX2 stages to operate them in two clock cycles.

Furthermore, to divide the EX stage to operate in two clock cycles, the CPWAIT signal output from the control unit 21 to the coprocessor 10 is enabled. The CPWAIT signal is a signal for specifying to the main processor 10 a period to interlock the pipeline.

The configurations of MULs 821 and 822, and a user-defined computing unit 823 corresponding to the EX stage of the coprocessor 20 are identical to those of the conventional coprocessor 80.

As described herein, the number of EX stages for the main processor 1 to execute the basic instruction is constant regardless of the clock frequency in the processor system 1 of FIG. 1. Assuming that the IF, DEC, and EX stages are executed in 1 clock cycle, the number of pipeline stages totaling from the IF to EX stages when executing the basic instruction is 3. The number of required clock cycles from the DEC to EX stages corresponding to the number of instruction execution cycles when executing the basic instruction is 2.

On the other hand the number of pipeline stages and the number of instruction execution cycles of the coprocessor 20 are changed depending on the clock frequency. If the clock frequency is low speed, as with the conventional processor system 7 shown in FIG. 8A, the number of clock cycles totaling from the IF to EX stages when executing the extended instruction is 3 and the number of instruction execution cycles is 2. On the other hand, if the clock frequency is high speed, as with the conventional processor system 7 shown in FIG. 5B, the number of clock cycles totaling from the IF to EX2 stages when executing the extended instruction is 4 and the number of instruction execution cycles is 3.

Figure 2A:
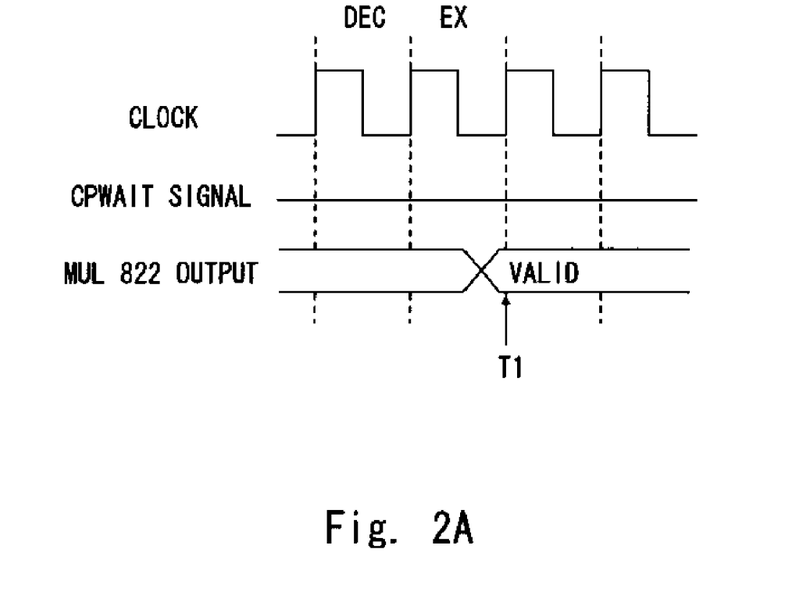
FIGS. 2A and 2B are timing diagrams for explaining an operation of a coprocessor mounted to a processor system according to the first embodiment of the present invention.
Figure 2B:
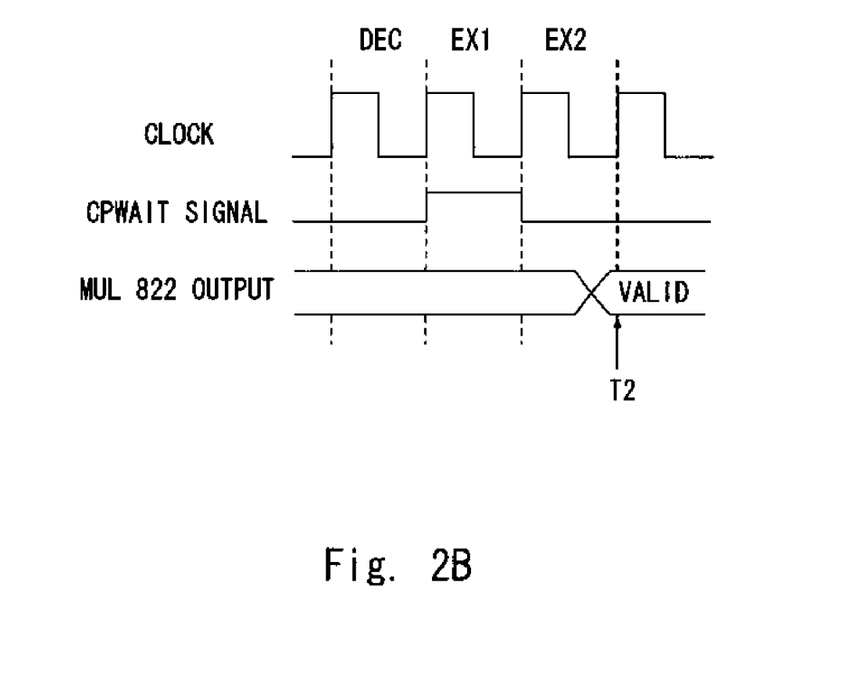

An output timing of the CPWAIT signal and a timing that the execution result of the extended instruction in the coprocessor 20 is written to the general purpose register 74 are described hereinafter in detail with reference to FIGS. 2A and 23. FIG. 2A shows a case with the clock frequency of the processor system 1 being low speed, and the number of pipeline stages and the number of instruction execution cycles are the same when executing the extended and the basic instructions. In this case, the CPWAIT signal will not be set enabled. An output of the computing unit (MUL 822) is enabled till the end time T1 of the EX stage of 1 clock cycle.

FIG. 23 shows a case with the clock frequency of the processor system 1 being high speed, and the number of pipeline stages and the number of instruction execution cycles when executing the extended instruction is longer than when executing the basic instruction. In this case, the CPWAIT signal is set enabled by the control unit 21 during 1 clock cycle corresponding to the EX1 stage. In FIG. 2B, the high level of the rectangular wave of the CPWAIT signal indicates that the CPWAIT signal is enabled. An output of the computing unit (MUL 822) is enabled till the end time T2 of the EX2 stage.

Figure 3A:
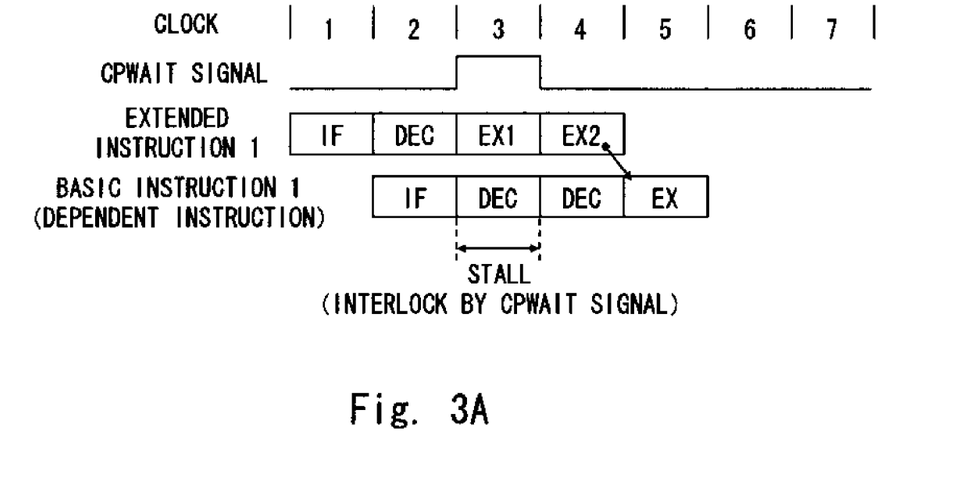
FIGS. 3A and 3B are timing diagrams for explaining an output timing of a CPWAIT signal.
Figure 3B:
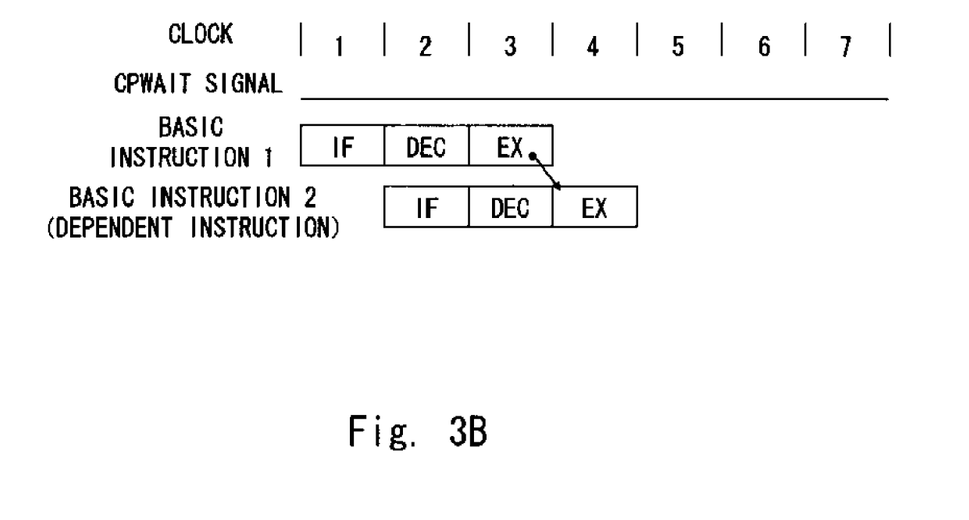

The interlock control using the CPWAIT signal by the pipeline control unit 131 is described hereinafter in detail. FIG. 3A is a view showing a case with the clock frequency being high speed, and after executing an extended instruction 1, the execution result of the extended instruction 1 is used by the next basic instruction 1 in the coprocessor 20. In this embodiment, the register operand from the general purpose register 74 is fetched at the beginning of the EX stage.

In executing the extended instruction 1, the CPWAIT signal is set by the control unit 21 at the beginning of the EX1 stage. In this embodiment, the number of instruction execution cycles of the extended instruction is 3, and the number of instruction execution cycles of the basic instruction is 2. Thus the CPWAIT signal is enabled for at least 1 clock cycle. The main processor 10 receiving the CPWAIT signal performs the interlock control to stop fetching next instructions by the instruction fetch unit 12 and decoding instructions by the instruction decode unit 13. With such interlock control, the pipeline of the main processor executing the basic instruction 1 is stalled for 1 clock. This enables to refer to the execution result of the extended instruction 1 of the EX2 stage in the EX stage of the basic instruction 1 that is executed after the stall.

If the number of instruction execution cycles of the coprocessor 20 is larger than the number of instruction execution cycles of the main processor 10, the processor system 1 of this embodiment is able to stall the pipeline of the main processor 10 only for a period corresponding to the difference between the number of instruction execution cycles of the coprocessor and the main processor 10 by the CPWAIT signal output from the coprocessor 20. By this operation, in case the number of instruction execution cycles of the coprocessor changes, data dependency between the extended and the basic instructions can be kept normal without changing the number of instruction execution cycles of he main processor.

Figure 4A:
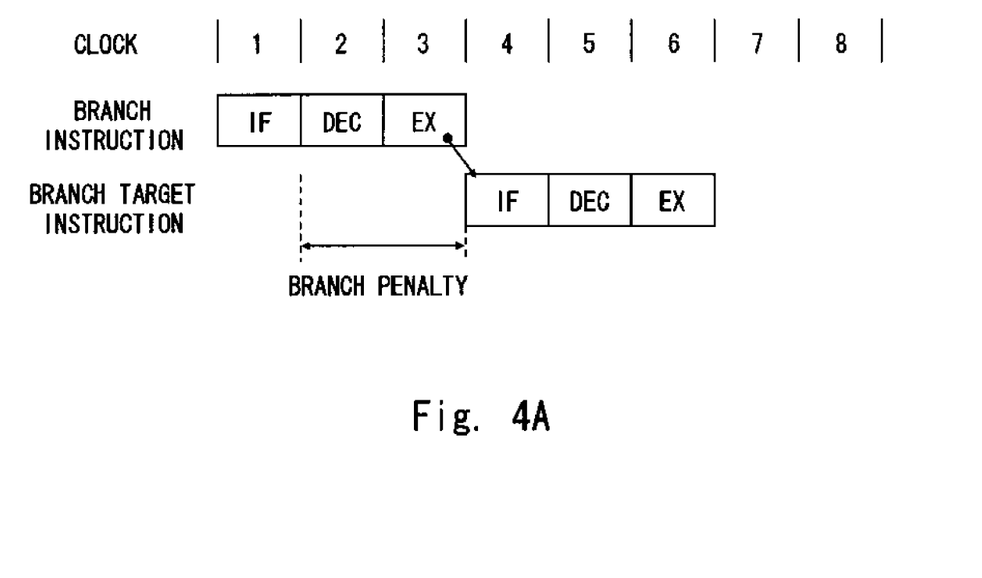
FIGS. 4A and 4B are timing diagrams for explaining advantageous effects of the present invention.

An improvement effect of the branch penalty in the main processor 10 is described hereinafter in detail with reference to FIGS. 4A and 4B. FIG. 4A is a timing diagram for executing a branch instruction in the processor system 1. With the processor system 1 as described above, the number of instruction execution cycles of the main processor 10 does not need to be changed depending on the number of instruction execution cycles of the coprocessor 20. Accordingly the number of clock cycles required from fetching of the branch instruction to determining a branch condition in the EX stage is 3 clock cycles even in a case the clock frequency is high speed. Thus the pipeline stall period, which is the branch penalty, is 2 clock cycles.

Figure 4B:
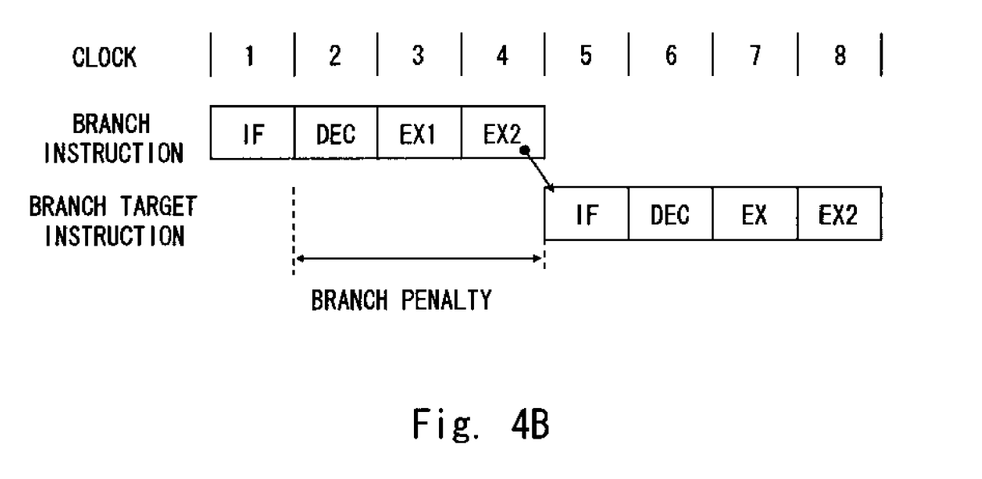

On the other hand FIG. 4B is a timing diagram showing a case of executing the branch instruction in the high speed operation of the conventional processor system 7. In the processor system 7, the EX stage of the main processor 70 is divided in response to the EX stage of the coprocessor 80 being divided. Thus 4 clock cycles are required to determine the branch condition from fetching of the branch instruction to determining the branch condition. Therefore, the branch penalty is 3 clock cycles.

With the processor system 1 of this embodiment as described in the foregoing, it is not necessary to increase the number of instruction execution cycles of the basic instruction in the main processor 10 even if the number of instruction execution cycles of the extended instruction in the coprocessor 20 increases as in the high speed operation. Thus the processor system 1 is able to suppress from the deterioration of the branch penalty. Further, as a redundant circuit for changing the number of instruction execution cycles of the main processor 10 is not required, the configuration of the main processor 10 can be simplified. Furthermore, as the hardware configuration of the main processor 10 does not need to be changed depending on the number of instruction execution cycles of the coprocessor connected to the main processor 10, a versatility of the main processor 10 can be improved.

In this embodiment, if the clock frequency is high speed, the number of instruction execution cycles of the extended instruction executed in the coprocessor 20 is increased for 1 clock cycle as compared to the number of instruction execution cycles of the basic instruction executed in the main processor 10. However such a configuration is merely an example. The present invention can be broadly applied to a processor system in which the number of instruction execution cycles of the extended instruction executed in the coprocessor is longer than the number of instruction execution cycles executed in the main processor.

In this embodiment, the EX stage is divided by the coprocessor 20 referring to the frequency flag 79 given to the main processor 10. However the frequency flag 79 may be provided to the coprocessor 20. The control unit 21 may compare the clock frequency input to the coprocessor 20 with a threshold to evaluate whether to divide the EX stage.

Second Embodiment

In the processor system 1 according to the first embodiment of the present invention, the coprocessor 20 evaluates that the pipeline of the main processor 10 should be interlocked. The main processor 10 performs the interlock control according to the CPWAIT signal output from the coprocessor 20. On the other hand a processor system 3 of this embodiment is characterized in that the interlock control is performed by the main processor 30 to evaluate whether to interlock its own pipeline by identifying the extended instruction, regardless of the CPWAIT signal output from the coprocessor 20.

Figure 5:
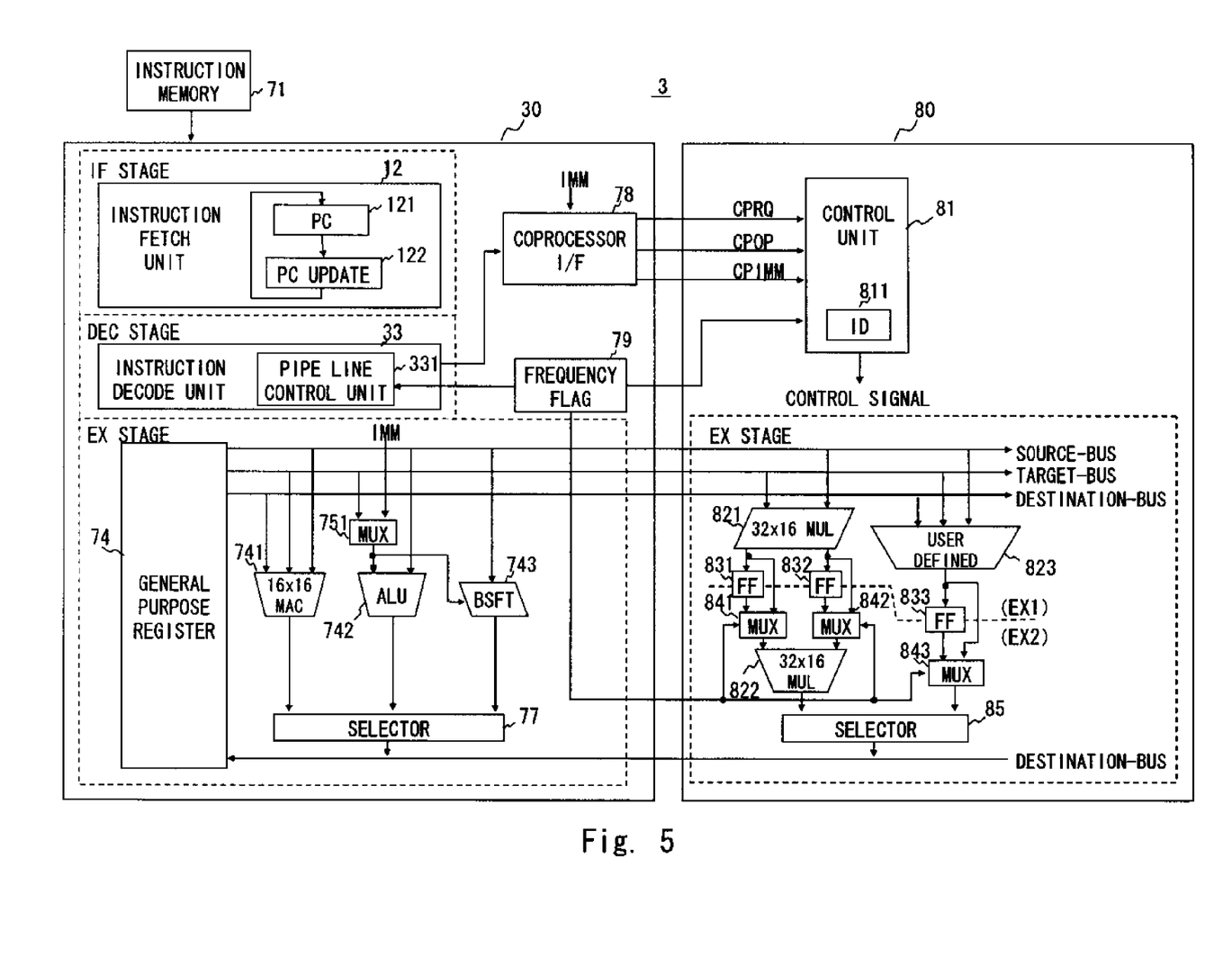
FIG. 5 is a block diagram showing a configuration of a processor system according to a second embodiment of the present invention.

The configuration of a processor system 3 of this embodiment is shown in FIG. 5. The processor system 3 includes the main processor 30 and the coprocessor 80 connected to the main processor 30. The coprocessor 80 is identical to the one included in the conventional processor system 7. Thus the detailed explanation will not be repeated here.

The instruction decode unit 33 included in the main processor 30 decodes the instruction retrieved by the instruction fetch unit 12. If the decoded instruction is the basic instruction, the instruction decode unit 33 issues an instruction to the computing units included in the main processor 30. On the other hand if the decoded instruction is the extended instruction, the instruction decode unit 33 transfers the instruction to the coprocessor 80 via the coprocessor I/F 78. A request signal (CPRQ) requesting to execute the extended instruction, an instruction code (CPOP), and an immediate value (CPIMM) are transferred from the coprocessor I/F 78 to the coprocessor 80. Further, the pipeline control unit 331 performs the interlock control for the pipeline process of the main processor 10.

The instruction decode unit 33 refers to the frequency flag 79 and decodes the extended instruction while the frequency flag 70 is set to on, the interlock control is executed to stop fetching next instructions by the instruction fetch unit 12 and decoding instructions by the instruction decode unit 33. Specifically, the main processor 30 evaluates that the number of instruction execution cycles of the extended instruction in the coprocessor 80 is larger than the number of instruction execution cycles of the basic instruction in the main processor 30 by referring to the condition of the frequency flag 79. Then the interlock control is performed in response to the instruction decode unit 33 decoding the extended instruction.

The period to interlock in decoding the extended instruction may be determined in advance according to the number of instruction execution cycles of the extended instruction in the coprocessor 80.

Components other than the instruction decode unit 33 included in the main processor 30 are identical to those in the main processor 10 of the first embodiment. The identical to those in the first embodiment are denoted by reference numerals identical to those therein with detailed description omitted.

Such configuration enables to determine whether to perform the interlock control at when the instruction decode unit 33 decodes the extended instruction. Thus it is possible to determine whether to perform the interlock control at a faster point as compared to the processor system 1 of the first embodiment. Furthermore, as the CPWAIT signal needs not to be transferred between the main processor 30 and the coprocessor 80, the interface between the main processor 30 and the coprocessor 80 can be simplified.

Third Embodiment

Figure 6:
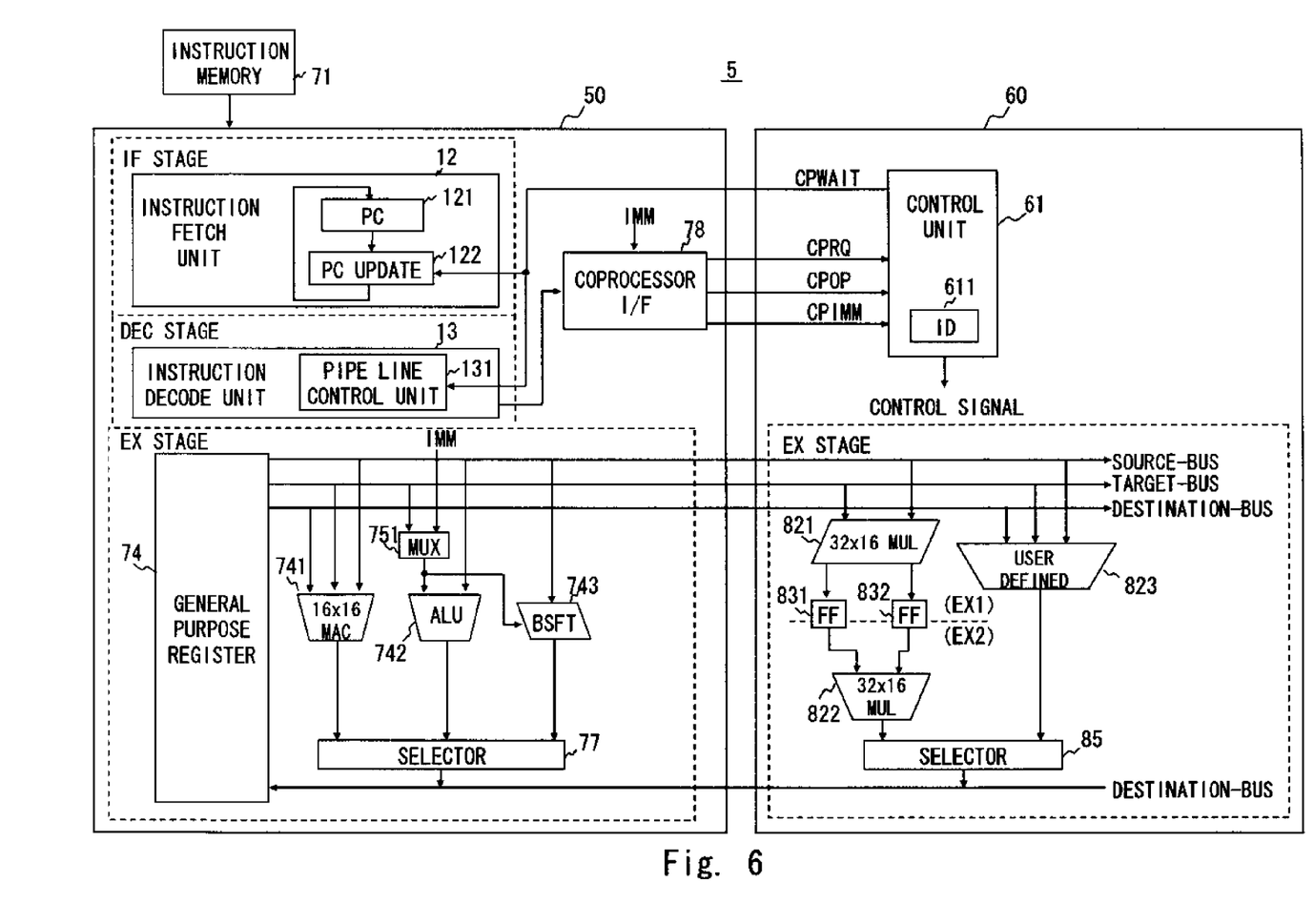
FIG. 6 is a block diagram showing a configuration of a processor system according to a third embodiment of the present invention.

A configuration of a processor system 5 of this embodiment is shown in FIG. 6. The processor system 5 includes a main processor 50 and a coprocessor 60 connected to the main processor 50. The main processor 50 is different from the main processor 10 of the first embodiment in that it does not include the frequency flag 79. Other components included in the main processor 50 are identical to those included in the main processor 10.

The coprocessor 60 changes the number of instruction execution cycles depending on the type of the extended instruction to be executed. 32 bits×16 bits multiplication instruction executed by the MULs 821 and 822 is executed in 2 clock cycles in the two stages, the EX1 and EX2 stages. On the other hand the EX stage is not divided for a user-defined instruction executed by the user-defined computing unit 823, but the user-defined instruction is executed in 1 clock cycle.

Thus the number of instruction execution cycles of the 32 bits×16 bits multiplication instruction is executed in the coprocessor 60 is 3, and the number of instruction execution cycles of the user-defined instruction is 2. The number of instruction execution cycles of the basic instruction executed in the main processor 50 is 2.

A control unit 61 receives CPRQ, CPOP, and CPIMM input via the coprocessor I/F 78. An instruction decode unit 611 outputs a control signal necessary for computing units included in the coprocessor 60 to execute the extended instruction. The control signal includes a processing request to the computing units, an indication of an operand register, and an immediate value. The control unit 61 evaluates the number of clock cycles required for the EX stage depending on the type of the extended instruction decoded by the instruction decode unit 611.

To be more specific, if the decoded instruction is the 32 bits×16 bits multiplication instruction, the control unit 61 divides the EX stage to operate in 2 clock cycles and also sets the CPWAIT signal to on. On the other hand if the decoded instruction is the user-defined instruction, the number of instruction execution cycles of the user-defined instruction is the same as the number of instruction execution cycles of the basic instruction executed in the main processor 50. Thus the CPWAIT signal will not be output.

As described in the foregoing, in the processor system 5 of this embodiment, the coprocessor 60 identifies the type of the extended instruction and the number of instruction execution cycles of the extended instruction is larger than the number of instruction execution cycles of the basic instruction, the CPWAIT signal is set enabled. Further, the main processor 50, as with the main processor 10 of the first embodiment, performs the interlock control according to the CPWAIT signal.

With such configuration, the number of instruction execution cycles of the basic instruction in the main processor 50 does not need to be changed even if the number of instruction execution cycles of the extended instruction in the coprocessor 60 changes depending on the type of the extended instruction. Thus it is possible to suppress the branch penalty from being deteriorated. As a redundant circuit for changing the number of instruction execution cycles of the main processor 50 is not required, the configuration of the main processor 50 can be simplified.

Other Embodiment

In the third embodiment, the type of the extended instruction is evaluated by the control unit 61 included in the coprocessor 60. However the interlock control can be performed in case the instruction decode unit 13 included in the main processor 50 evaluates the type of the extended instruction, and the type indicates an extended instruction having a long number of instruction execution cycles.

Such configuration enables to determine whether to perform the interlock control at when the instruction decode unit 13 decodes the extended instruction. Thus it is possible to determine whether to perform the interlock control at a faster point as compared to the processor system 5 of the third embodiment. Furthermore, as the CPWAIT signal needs not to be transferred between the main processor 50 and the coprocessor 60, the interface between the main processor 50 and the coprocessor 60 can be simplified.

The configurations of the computing units included in the main processor and the coprocessor of the first to the third embodiments are examples. They are selected as appropriate depending on the process of the processor system.

It is apparent that the present invention is not limited to the above embodiment and it may be modified and changed without departing from the scope and spirit of the invention.

What is claimed is:

1. A processor system comprising:
   a main processor having an instruction fetch unit fetching an instruction to be executed from an instruction memory,
   an instruction decode unit decoding an instruction to be executed; and
   an instruction execution unit executing an basic instruction to be executed in said main processor side, said main processor performing a pipeline processing by using said instruction fetch unit, said instruction decode unit, and said instruction execution unit; and
   a coprocessor coupled to said main processor and having another instruction execution unit executing an extended instruction to be executed in said coprocessor side, the number of stages of said another instruction execution unit being larger than the number of stages of said execution unit in said main processor when an frequency flag indicates that a high speed clock signal is provided to said processor system,
   wherein said main processor ceases said pipe line processing for a preliminarily determined period without responding to a wait signal from said coprocessor, when said frequency flag indicates that a high speed clock signal is provided to said processor system and said instruction decode unit decodes said extended instruction.

2. The processor system according to claim 1, wherein said main processor ceases said pipe line processing by stopping an operation of said instruction fetch unit and an operation of said instruction decode unit.

3. The processor system according to claim 1, wherein the number of stages of said another instruction execution unit is equal to said number of stages of said instruction execution unit when said frequency flag indicates that a low speed clock signal is provided to said processor system.

4. The processor system according to claim 1, wherein said coprocessor further has another instruction decode unit decoding said extended instruction and said another instruction decode unit outputs a control signal for executing said extended instruction.

5. The processor system according to claim 4, wherein each of said instruction decode unit and said another instruction decode unit refers to said frequency flag indicating whether a high speed clock signal is provided to said processor or not.

6. The processor system according to claim 1, wherein the instruction decode unit decodes the instruction retrieved by the instruction fetch unit.

* * * * *

UNITED STATES PATENT AND TRADEMARK OFFICE
CERTIFICATE OF CORRECTION

PATENT NO. : 7,539,847 B2  Page 1 of 1
APPLICATION NO. : 11/625639
DATED : May 26, 2009
INVENTOR(S) : Shinji Kashiwagi It is certified that error appears in the above-identified patent and that said Letters Patent is hereby corrected as shown below:

Column 6, Line 38 delete "23" insert --2B--.

Signed and Sealed this

Thirteenth Day of October, 2009

David J. Kappos
*Director of the United States Patent and Trademark Office*